US008010577B1

(12) United States Patent
Tibbett

(10) Patent No.: US 8,010,577 B1
(45) Date of Patent: Aug. 30, 2011

(54) TRAVERSAL ORDER VISUALIZATION
(75) Inventor: Stephen Tibbett, Ottawa (CA)
(73) Assignee: Adobe Systems Incorporated, San Jose, CA (US)
( * ) Notice: Subject to any disclaimer, the term of this patent is extended or adjusted under 35 U.S.C. 154(b) by 423 days.
(21) Appl. No.: 12/037,810
(22) Filed: Feb. 26, 2008
(51) Int. Cl.
*G06F 17/30* (2006.01)
(52) U.S. Cl. ........................................ 707/804; 707/805
(58) Field of Classification Search .................. 707/804, 707/805
See application file for complete search history.

(56) References Cited

U.S. PATENT DOCUMENTS

2005/0172237 A1* 8/2005 Cragun et al. ................. 715/744
2007/0130153 A1* 6/2007 Nachman et al. .............. 707/10

OTHER PUBLICATIONS

"Creating Forms in Microsoft Access", [Online]. Retrieved from the Internt: <URL: http://lis.dickinson.edu/Technology/Training/Tutorials/MsAccess/forms.htm>, (Jan. 18, 2008),6 pgs.

"To Change the Order of Tabs",[Online]. Retrieved from the Internet: <URL: http://publib.boulder.ibm.com/infocenter/cqhelp/v7r0m0/index.jsp?topic=/com.ibm.rational.clearquest.schema.doc/t_change_ order_tabs.htm>, (Jan. 18, 2008),1 pg.

* cited by examiner

*Primary Examiner* — Robert Stevens
*Assistant Examiner* — Dennis Myint
(74) *Attorney, Agent, or Firm* — Schwegman, Lundberg & Woessner, P.A.

(57) ABSTRACT

In one example embodiment, a system and method is illustrated that includes retrieving a document having a plurality of input mechanisms to receive input from a user. Further, the system and method may include determining an input ordering relating to the plurality of input mechanisms. Additionally, the system and method may include in conjunction with a display of the document, dynamically displaying a visual indication of the input order relating to the plurality of input mechanisms. The system and method may include retrieving a document including a plurality of text fields. In addition, determining a reading order relating to the plurality of text fields. Moreover, in conjunction with a display of the document, dynamically displaying a visual indication of the reading order relating to the plurality of text fields.

19 Claims, 18 Drawing Sheets

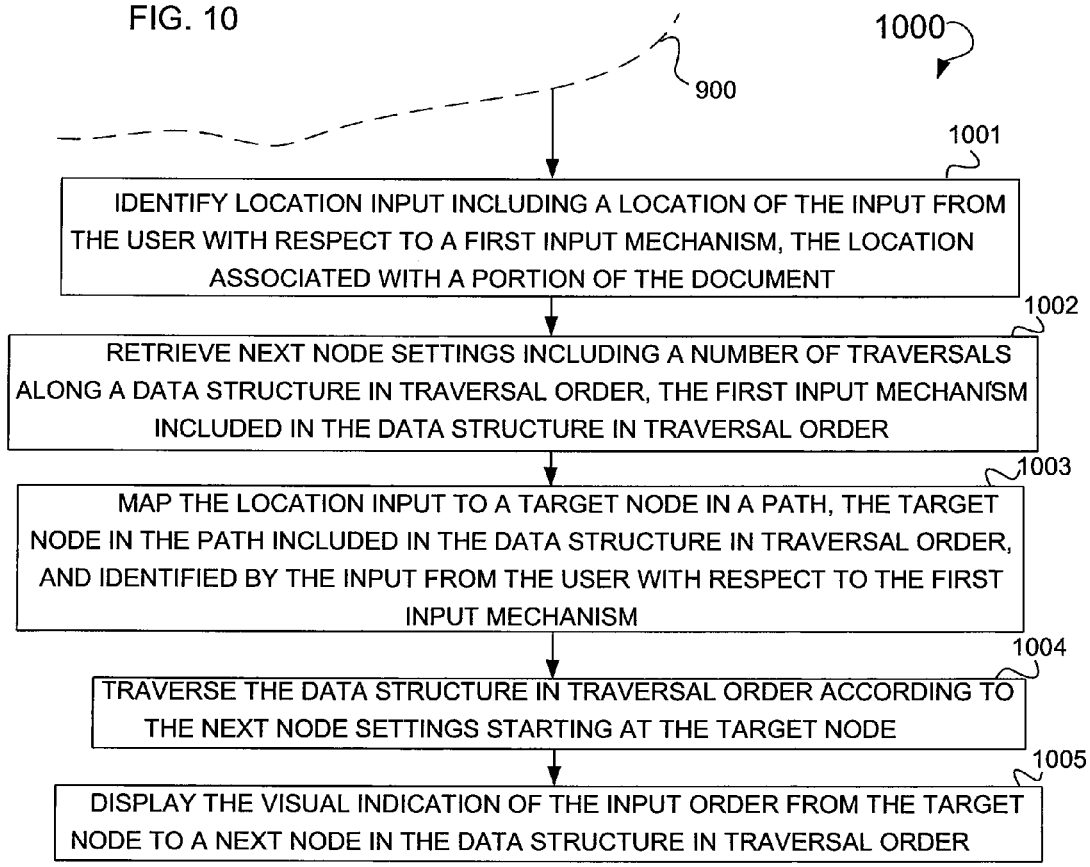
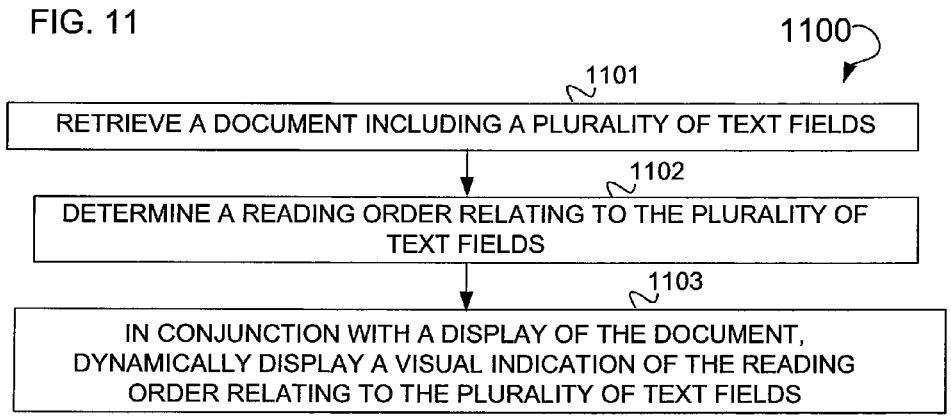

FIG. 14

ACME COMPANY, INC.
PURCHASE ORDER

| DATE | REQUISITION NUMBER | VENDOR CODE |
|---|---|---|
| PO_DATE | REQ_NO | VENDOR_CODE |

VENDOR

SHIP TO

| ITEM NO | DESCRIPTION | UNITS | UNIT PRICE | TOTAL PRICE |
|---|---|---|---|---|
| ITEM | DESCRIPTION | UNITS | UNIT_PRICE | TOTAL_PRICE |
| 1401 | 1402 | 1403  1404 HOVER | 1405 | 1406 |
|  |  |  |  |  |
|  |  |  |  |  |

| | SUBTOTAL | SUBTOTAL |
|---|---|---|
| | TAX 7.25% | TAX |
| | TOTAL | TOTAL_PRICE |

DELIVERY INSTRUCTIONS

DEL_INSTR

ACME COMPANY, INC.
PURCHASE ORDER

| DATE | REQUISITION NUMBER | VENDOR CODE |
|---|---|---|
| PO_DATE | REQ_NO | VENDOR_CODE |

VENDOR

SHIP TO

| 1701 ITEM NO | 1702 DESCRIPTION | 1703 UNITS | 1704 UNIT PRICE | TOTAL PRICE |
|---|---|---|---|---|
| ① ITEM | ② DESCRIPTION | ③ UNITS | ④ UNIT_PRICE | ⑤ TOTAL_PRICE |
| 1401 | 1402 | 1403 1404 HOVER | 1405 | 1406 |
| | | | SUBTOTAL | SUBTOTAL |
| | | | TAX 7.25% | TAX |
| | | | TOTAL | TOTAL_PRICE |

DELIVERY INSTRUCTIONS

DEL_INSTR

US 8,010,577 B1

TRAVERSAL ORDER VISUALIZATION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

TECHNICAL FIELD

The present application relates generally to the technical field of algorithms and programming and, in one specific example, the visual representation of a traversal order.

BACKGROUND

An eXtensible Markup Language (XML) is a general-purpose markup language. In some cases, families of XML based specifications have been developed to perform a number of functions relating to the sharing of structured data. These families include the XML Forms Architecture (XFA). XFA may be used in conjunction with, for example, the Document Object Model (DOM) to generate a structure representing a document. These documents may be text documents such as online documents containing fields that a user may traverse.

BRIEF DESCRIPTION OF THE DRAWINGS

Some embodiments are illustrated by way of example and not limitation in the figures of the accompanying drawings in which:

FIG. 10 is a flow chart illustrating a continuation of a method, according to an example embodiment, used to generate a document with a traversal order shown.

FIG. 11 is a flow chart illustrating a method, according to an example embodiment, used to generate a document with a traversal order shown for text fields.

FIG. 14 is a document, according to an example embodiment, illustrating a number of fields within a document as may be rendered within a design IDE or document viewer.

FIG. 17 is an illustration of a document, according to an example embodiment, with a traversal order shown for fields within the document.

DETAILED DESCRIPTION

Figure 1:
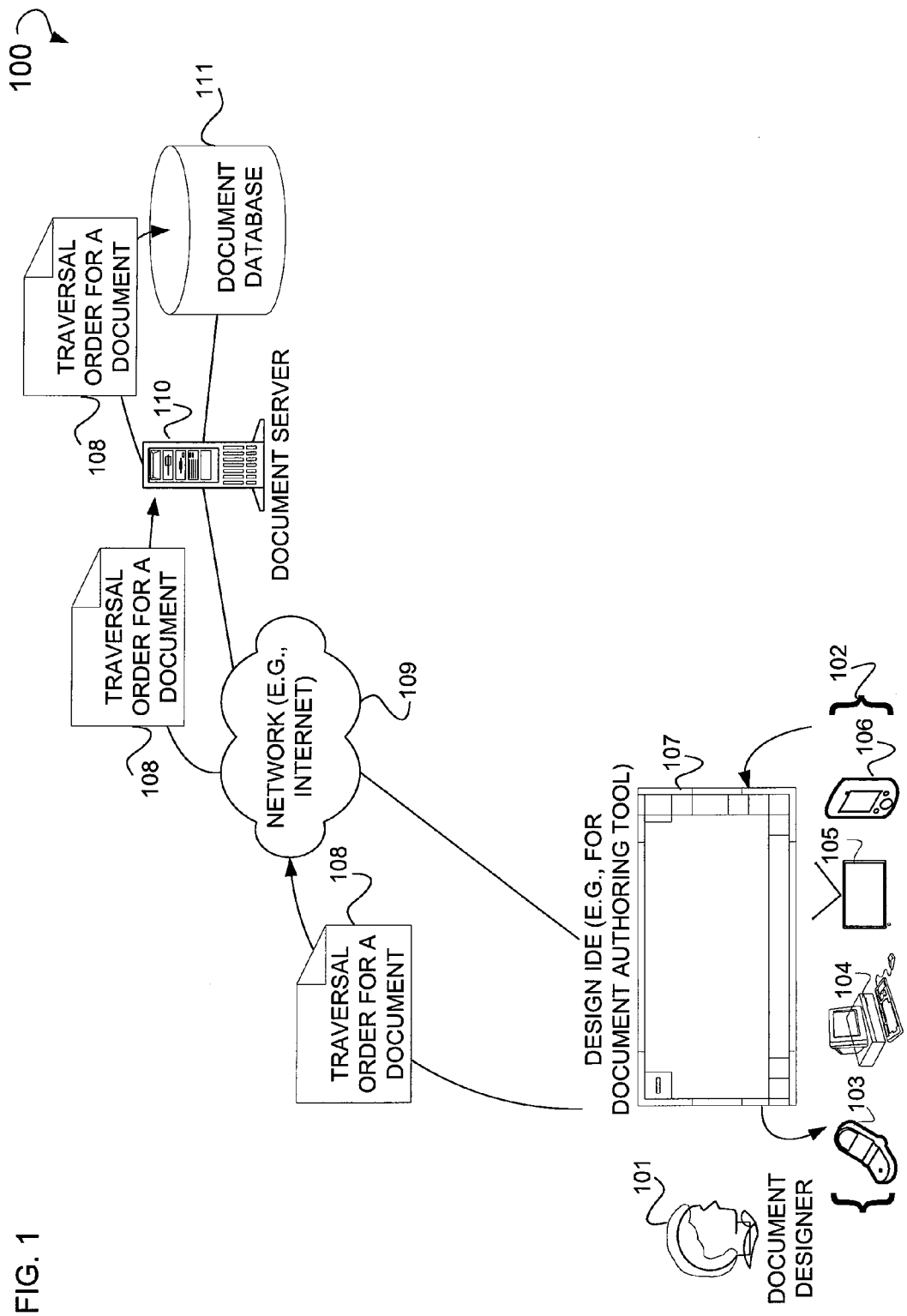
FIG. 1 is a diagram of a system, according to an example embodiment, used to denote a traversal order in a document.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is shown that allows a user to determine whether the traversal order for a document is correct. This determination may be made by the user using an input device such as a mouse, and associated cursor, to move through the document observing a sequence of arrows denoting a traversal order. This input device may also be a light pen, touch screen, or other suitable input device. The document may be composed of a number of forms, sub forms and fields (e.g., collectively input mechanisms). This document may be a Hyper Text Markup Language (HTML) or XML based document. A field may include an object or widget such as, for example, a list box, button, radio button, or fillable text box. Using XFA and DOM, these forms, sub forms and fields may be represented in a tree structure. A tree structure may be a data structure representing a simple and connected acyclic graph. This tree structure may represent the forms, sub forms, and fields as nodes. In some example embodiments, only the nodes surrounding the node upon which the cursor is hovering (e.g., the node having the focus of the cursor) have their traversal visually shown. In some example embodiments, the tree may reflect the structural information associated with a document.

Some example embodiments may include the presenting of an arrow for each traversal between a form, sub form, or fields in a document. This arrow may appear visually to a user as rendered by an Integrated Development Environment (IDE) or document viewer. The traversal order of a plurality of these arrows may be dictated by a document designer. In some example embodiments, this arrow serves as a visual representation of a traversal. In other example embodiments, another visual representation of a traversal may be implemented such as a line, highlight, a segmented line, or some other suitable visual representation of a traversal. An individual traversal that is part of a traversal order may be a property of a node in a tree structure that indicates related nodes for traversal purposes. Traversal can point to multiple nodes, for example, "first" or "next." In some example embodiments, a single or multiple traversal paths may be utilized. A traversal order is the path through the forms, sub forms, or fields of a document as executed through the use of an input device. For example, a traversal order may be followed where a user executes a "Tab" command from a keyboard to traverse through the fields of an online document. In some example embodiments, the arrow may be a visual indication of the input order.

In some example embodiments, a traversal order may be a reading order. A reading order may be the sequence in which static text fields are read by, for example, a screen reader application. A screen reader application may be a software application that attempts to identify and interpret what is being displayed on a computer screen. Some well known screen reader applications include the Job Access With Speech (JAWS) screen reader, and the Linux Screen Reader (LSR). One or more visual representations of a traversal in the form of an arrow may reflect this reading order.

In some example embodiments, the system and method may provide the user with certain indicator numbers as to the traversal order and the forms, sub forms and fields associated with the traversal order. For example, a show tab order mode may be implemented wherein an indicator number is presented and visually associated with the form, sub form or field. This indicator number may appear at the top right corner of the form, sub form or field as it appears in the document. Some other suitable position, such as the top left corner may also be used. In some example embodiments, this indicator number may be a visual indication of the input order.

In some example embodiments, the previously referenced XFA technology may be utilized to display a traversal order for a document. XFA may be used to define a traversal property which indicates related nodes for the purpose of traversing through the nodes in sequence. For example, using XFA three fields—Field1, Field2, and Field3 may be defined as part of a document. Field1 might have a "next" traversal that targets Field2, which would have a traversal that targets Field3. The traversal order in this example may be: Field1→Field2→Field3.

In some example embodiments, when the user places the mouse cursor over a node, the node may be temporarily highlighted to indicate to the user which node the cursor is over. Further, when in show tab order mode, this highlight is extended to present an extra highlight over the hovered node, and to include the traversal arrows. Additionally, when show tab order is enabled and the user hovers over a node (e.g., a target node), the traversal order for the document may be generated (e.g., a list of nodes in traversal order) and this order is walked using an interator until the hovered node is found. The iteration may then be backed up 1 or 2 nodes (e.g., depending on whether the target node is at the front of the list, 1 traversal from the front 2 traversals from the front etc.) and the arrow presentation may begin. In some example embodiments, the traversal order may be walked recursively until the hover node is found.

In some example embodiments, arrow presenting involves calculating the location of the indicator number for the current node, calculating the location of the indicator number for the next node in traversal sequence, and presenting a line and an arrowhead rotated to the angle of the line. When the cursor moves off the currently hovered node, the hovered node may be or'ed (e.g., a logical union (U) operation may be executed) with the surrounding nodes and may be invalidated, so the arrows are no longer visually represented.

The traverse order may be shown through using some type of document authoring tool. This document authoring tool (e.g., a design IDE) may include Adobe Systems Inc.'s LIVE-CYCLE DESIGNER™ tool. This document authoring tool may work in conjunction with a document server application such as Adobe Systems Inc.'s LIVECYCLE FORM SERVER™ application. In one example embodiment, a document designer may generate a traversal order for a document and its associated forms, sub forms and fields. This traversal order may be associated with the document stored by a document server for future use.

Example System

FIG. 1 is a diagram of an example system 100 used to denote a traversal order in a document. Shown is a document designer 101 who, utilizing a design IDE 107, generates a traversal order for a document. This design IDE 107 may reside upon any one of a number of devices 102 including, for example, a cell phone 103, a computer system 104, a television or monitor 105, a Personal Digital Assistant (PDA) 106, or a smart phone (not shown). Using this design IDE 107, the document designer 101 may generate and transmit a traversal order for a document 108 that may be transmitted across a network 109 to be received by a document server 110. The traversal order for a document 108 may be in the form of an XML representation of the traversals between fields, sub forms or forms within a document (e.g., collectively referenced as an input ordering). This document server 110 may then store this traversal order for a document 108 into a document database 111. In some example embodiments, this traversal order for a document 108 may be transmitted to a web server that is operatively coupled to the document server 110. In some example embodiments, this document server 110 may also be operatively connected to a database server that may, in turn, be operatively connected to the document database 111. The database server may store the traversal order for a document 108 into the document database 111.

Figure 2:
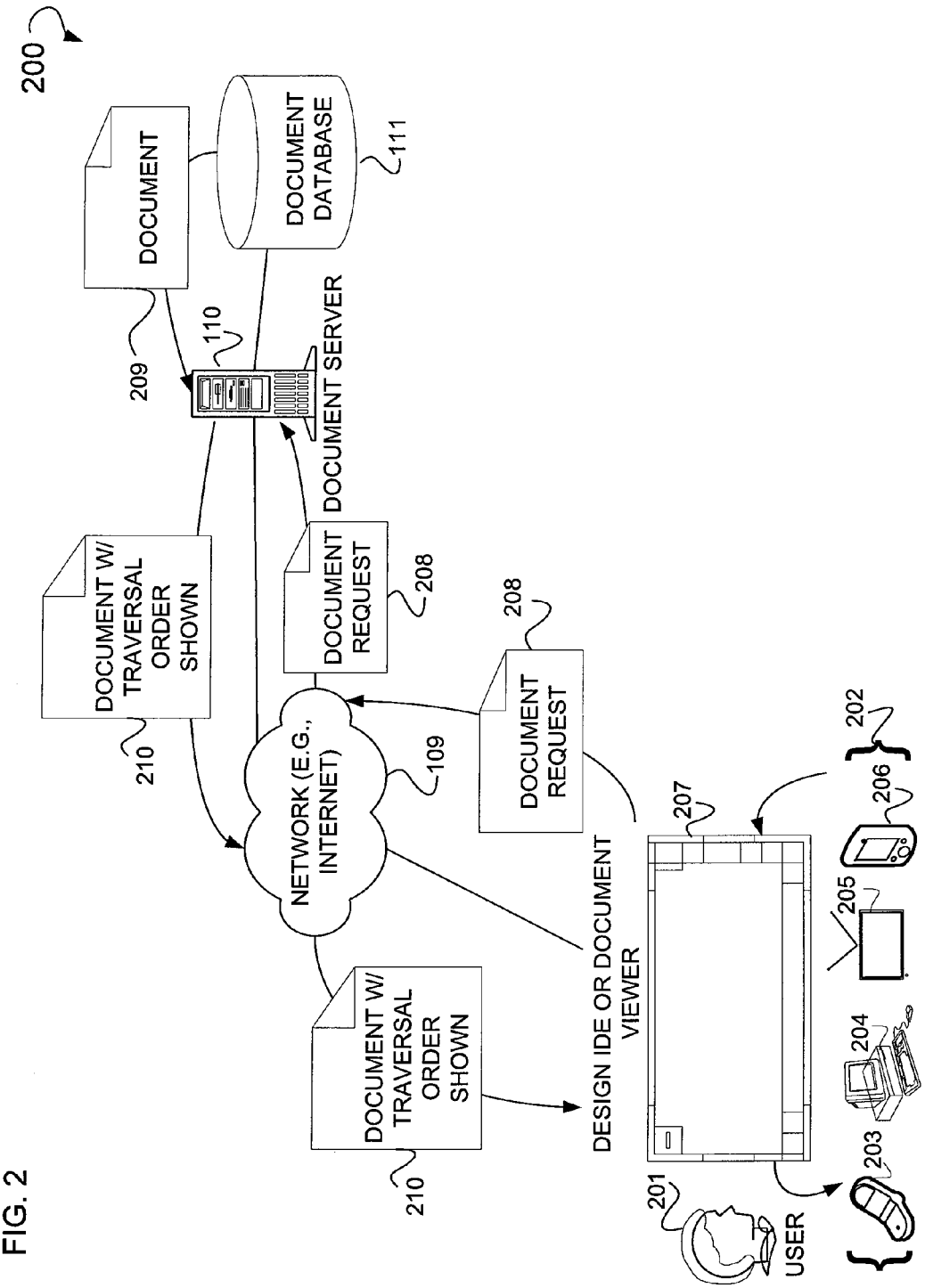
FIG. 2 is a diagram of a system, according to an example embodiment, used to generate a document with a traversal order shown.

FIG. 2 is a diagram of an example system 200 used to generate a document with a traversal order shown. Illustrated is a user 201, who utilizing a design IDE or document viewer 207, generates a document request 208. This design IDE or document viewer 207 may be, for example, Adobe Systems Inc.'s LIVECYCLE DESIGNER™ tool, ACROBAT™ document viewer, or an XML capable interpreter such as Microsoft Corporation's INTERNET EXPLORER™, or Mozilla Corporation's FIREFOX™. This design IDE or document viewer 207 may reside upon any one of a number of devices 202. These devices 202 may include, for example, a cell phone 203, a computer system 204, a television or monitor 205, a PDA 206 or a smart phone (not shown). Using this design IDE or document viewer 207, user 201 may generate a document request 208. This document request 208 may be transmitted across a network 109 to be received by the document server 110. The document server 110 may retrieve a document 209 from a document database 111. This document 209 may include an XML representation of the traversals between fields, sub form or forms within the document. Document server 110 may generate a document with a traversal order shown 210 that the document server 110 may transmit across the network 109 to be received by the one or more devices 202. This document with traversal order shown 210 may then be displayed within the IDE or document viewer 207 to be reviewed by the user 201. In some example embodiments, the user 201 is a document designer such as document designer 101. Further, the user 201 may be an end user of the document.

Example Interface

Figure 3:
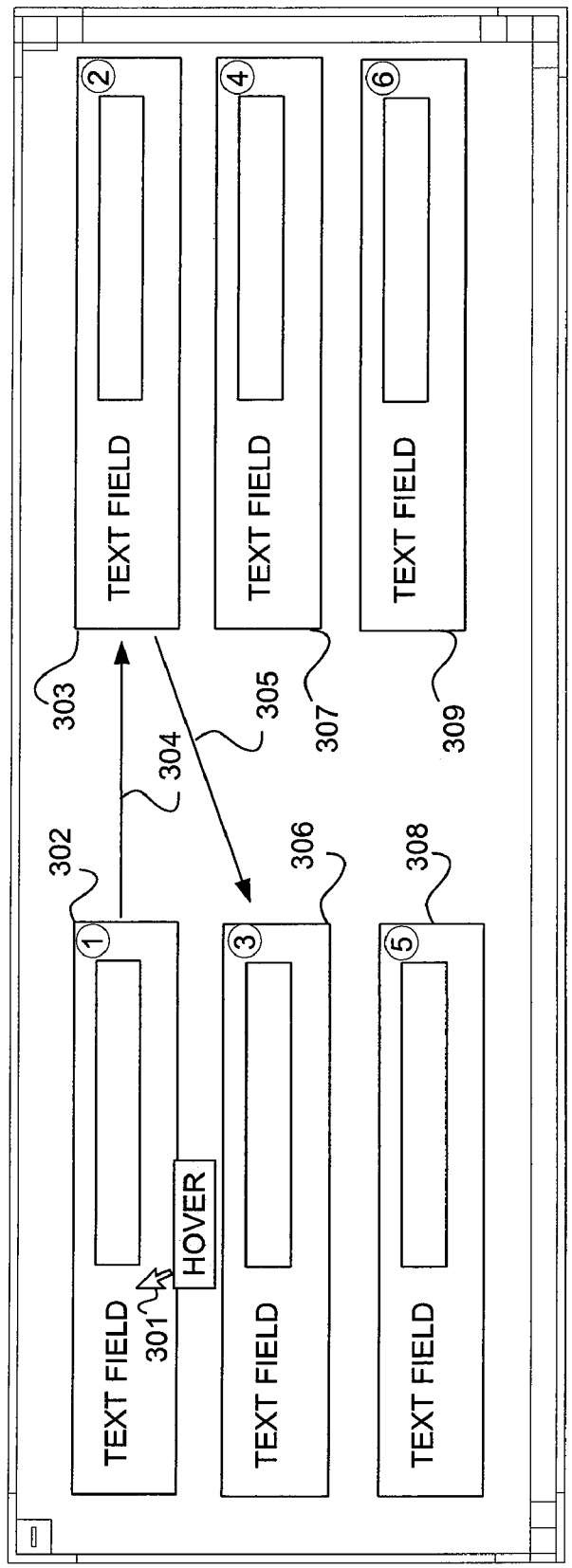
FIG. 3 is a diagram of a design Integrated Development Environment (IDE) or document viewer, according to an example embodiment, rendering a document with a traversal order shown.

FIG. 3 is a diagram of the design IDE or document viewer 207 rendering an example document with traversal order shown. Shown is a cursor 301 denoting a particular hover. Also shown is a plurality of indicator numbers denoting a traversal order for the forms, sub forms and fields associated with the document. These indicator numbers are shown in the upper right corner of each field (e.g., text field). The cursor 301 is hovered on a text field 302. Also shown is text field 303, text field 306, text field 307, text field 308 and text field 309. Further, a number of arrows are shown denoting a traversal order amongst the text fields. Illustrated is an arrow 304 showing the traversal from the text field 302 to the text field 303. An additional arrow 305 is shown denoting a traversal from the text field 303 to the text field 306. This traversal order may be represented as: text field 302→text field 303→text field 306.

Figure 4:
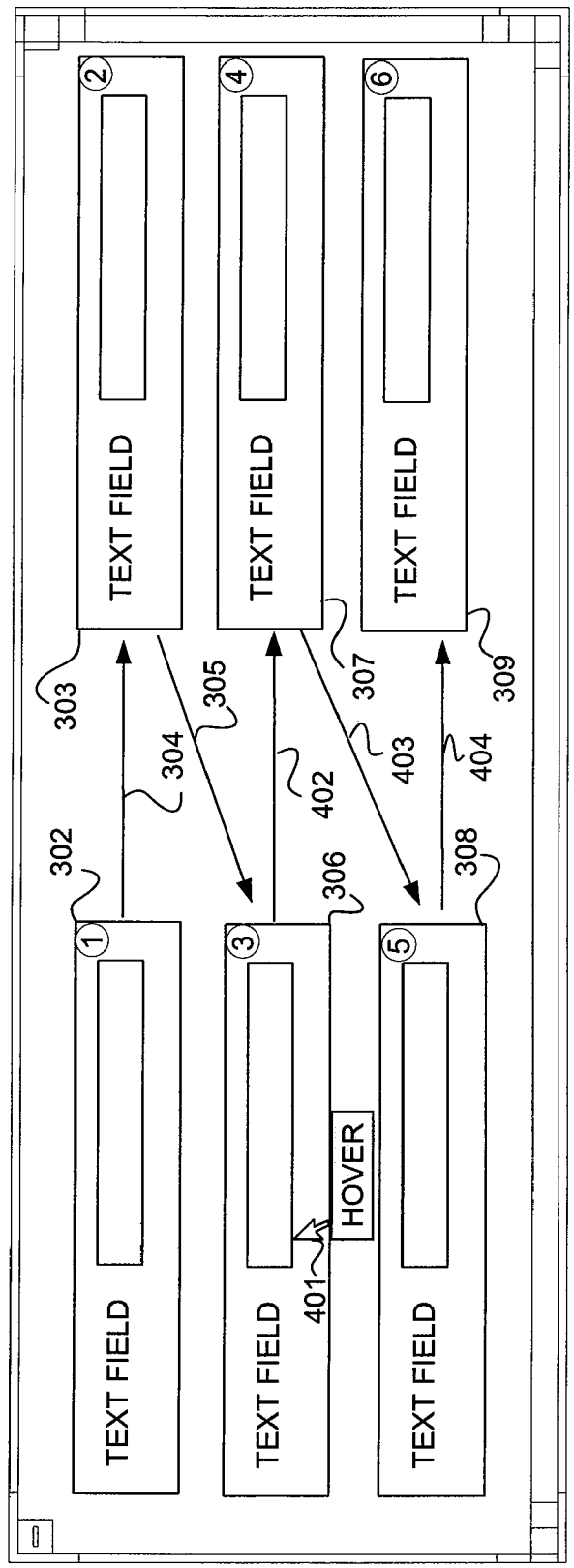
FIG. 4 is a diagram of an IDE or viewer, according to an example embodiment, rendering a document with a traversal order shown through all the text fields in the document.

FIG. 4 is a diagram of an example IDE or document viewer 207 rendering an example document with a traversal order shown through all the text fields in the document. Illustrated is a cursor 401 that is hovered upon the text field 306. Also shown is an arrow 402 denoting a traversal from the text field 306 to the text field 307. A further arrow 403 is shown denoting a traversal from the text field 307 to the text field 308. A further arrow 404 is shown denoting a traversal from the text field 308 to the text field 309. Taken in combination with the previously illustrated traversals, the traversal order for this document may be represented as: text field 302→text field 303→text field 306→text field 307→text field 308→text field 309.

Figure 5:
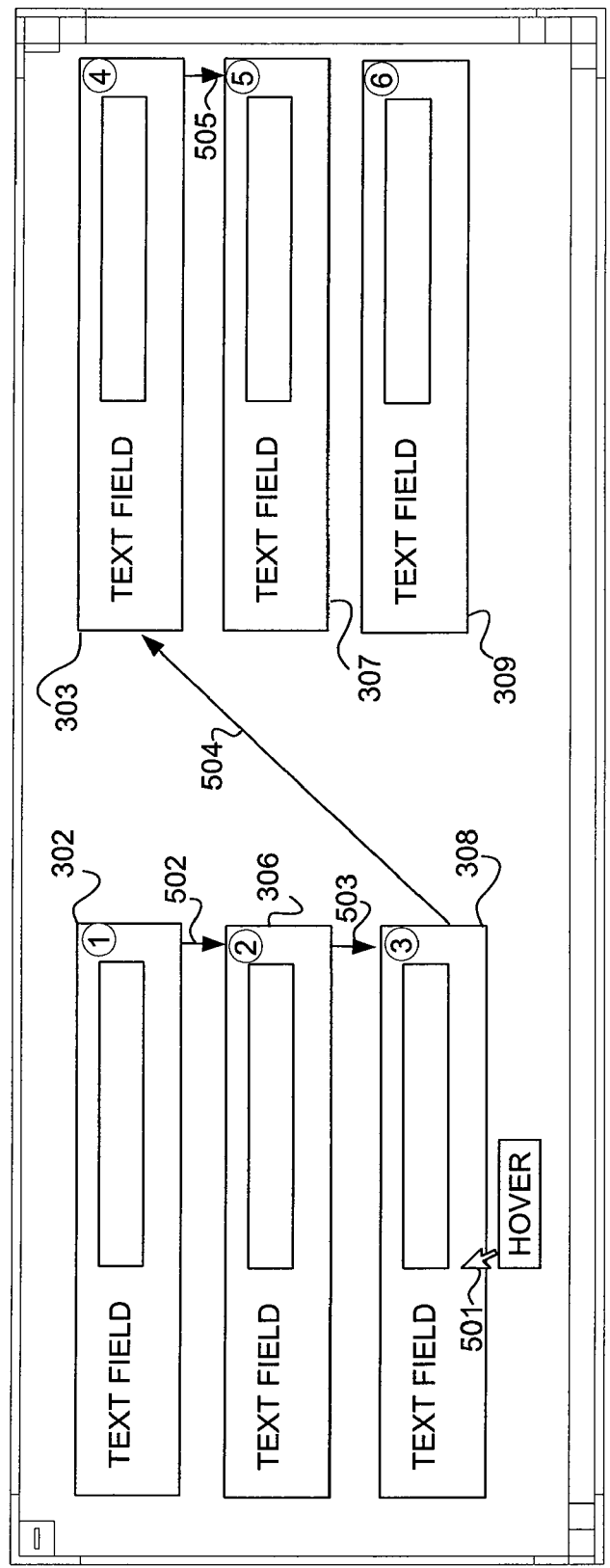
FIG. 5 is a design IDE or document viewer, according to an example embodiment, rendering a document with a vertical traversal order.

FIG. 5 is an example design IDE or document viewer 207 rendering an example document with a vertical traversal order. Shown is a plurality of indicator numbers as to the traversal order for the forms, sub forms and fields associated with the document. These indicator numbers are shown in the upper right corner of each field (e.g., text field). A cursor 501 denotes the hover of the traversal order which in this case is text field 308. Shown is the text field 302 and text field 306. An arrow 502 denotes a traversal from the text field 302 to the text field 306. A further arrow 503 denotes a traversal from the text field 306 to a text field 308. An additional arrow 504 denotes a traversal from the text field 308 to a text field 303. A further arrow 505 denotes a traversal from the text field 303 to a text field 307. This vertical traversal order may be represented as: text field 302→text field 306→text field 308→text field 303→text field 307.

Figure 6:
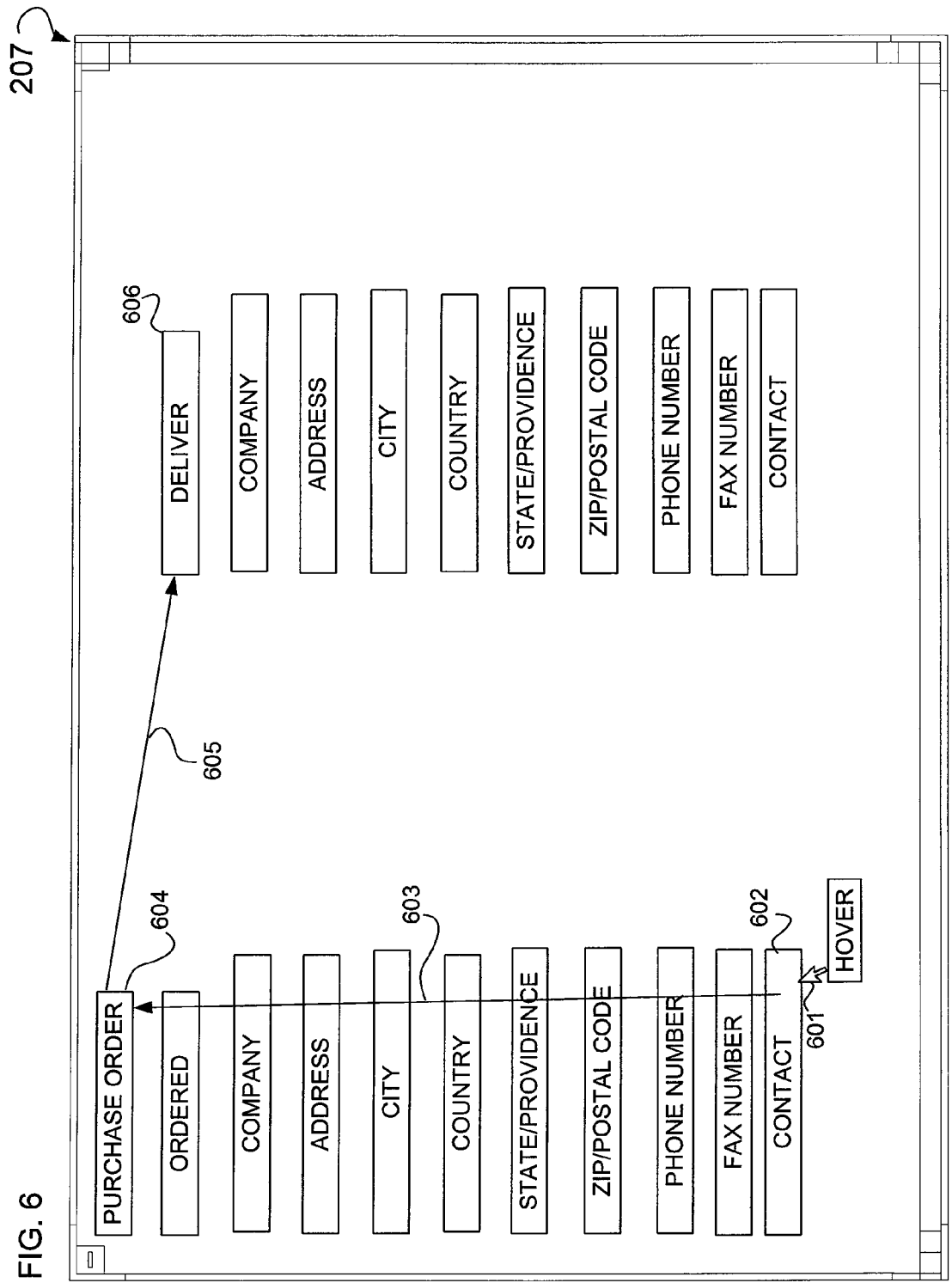
FIG. 6 is a diagram of an IDE or document viewer, according to an example embodiment, rendering a document traversal order for a purchase order document.

FIG. 6 is a diagram of an example IDE or document viewer 207 rendering an example document traversal order for a purchase order document. Shown is a cursor 601 hovering on a text field 602. An arrow 603 denotes a traversal from the field 602 to a text field 604. A further arrow 605 denotes a traversal from the field 604 to a text field 606. This traversal order may be represented as: text field 602→text field 604→text field 606. As will be more fully illustrated below, the traversal order may be between fields whereas, in other example embodiments, traversal order may be between a field and a form, or sub form.

Figure 7:
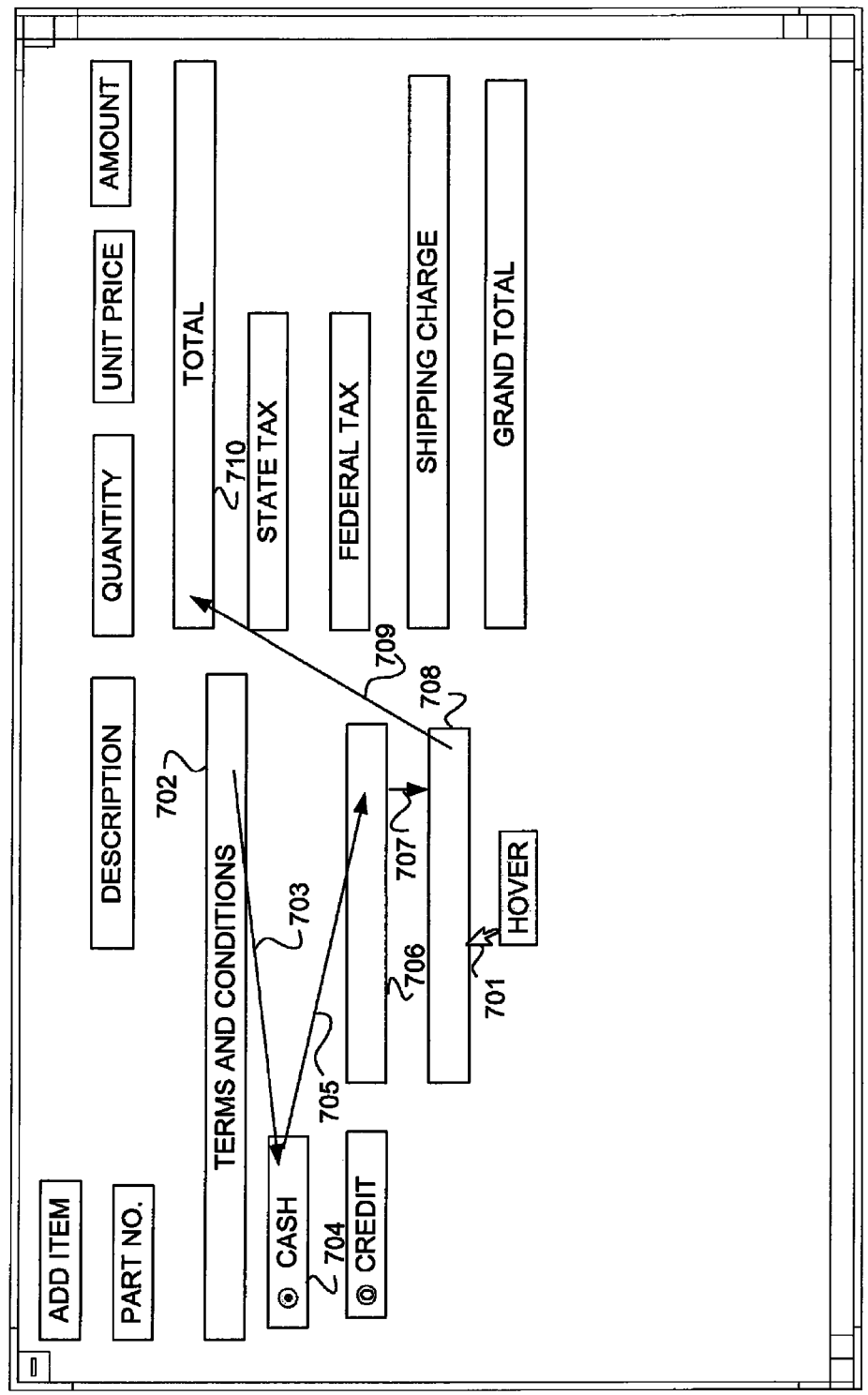
FIG. 7 is an illustration of a design IDE or document viewer, according to an example embodiment, rendering a traversal order for a shipping purchase document.

FIG. 7 is an illustration of an example design IDE or document viewer 207 rendering an example document traversal order for a shipping purchase document. Shown is a cursor 701 hovered upon a text field 708. An arrow 703 shows a traversal between a field 702 and a text field 704. An arrow 705 shows a traversal from the field 704 to a text field 706. An arrow 707 shows a traversal from the field 706 to a text field 708. An arrow 709 shows a traversal from the field 708 to a text field 710. This traversal order may be represented as: text field 702→text field 704→text field 706→text field 708→text field 710.

Example Logic

Figure 8:
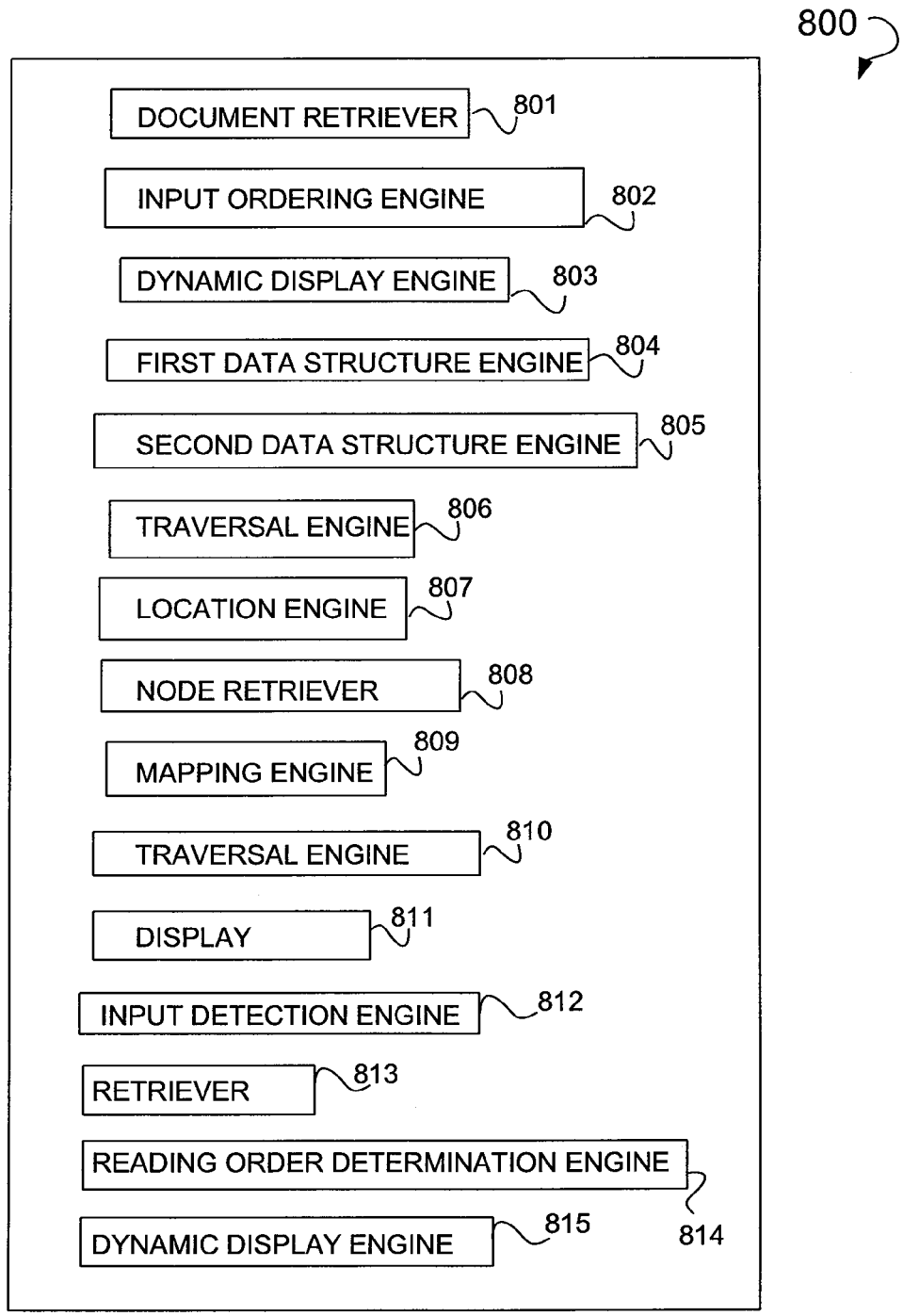
FIG. 8 is a block diagram of a computer system, according to an example embodiment, used to generate a document with traversal order shown.

FIG. 8 is a block diagram of a computer system 800. This computer system 800 may be the one or more devices 102, document server 110, and/or the one or more devices 202. The various blocks shown herein may be implemented in software, firmware or hardware. Shown is a document retriever 801 to retrieve a document that includes a plurality of input mechanisms to receive input from a user. An input ordering engine 802 is shown to determine an input ordering that includes the plurality of input mechanisms. A dynamic display engine 803 is shown to, in conjunction with a display of the document, dynamically display a visual indication of the input order that relates to the plurality of input mechanisms. In some example embodiments, the plurality of input mechanisms include at least one of an input field, a radio button or a check box. Some example embodiments may include, the input ordering engine 802 using input ordering as performed through the use of structural information derived from the document. In some example embodiments, the input ordering engine 802 uses input ordering information associated with the document. In some example embodiments, the display of the visual indication includes a display of the visual indicia that indicate a sequence in which the user is to provide input through the use of the plurality of mechanisms. Further, the display of the visual indicia may include the generation of and display of direction indicators between the plurality of input mechanisms of the document as displayed. In some example embodiments, the direction indicators are arrows. In some example embodiments, a first data structure engine 804 is shown to build a first data structure through the use of the document, the first data structure that includes nodes that include a first input mechanism and a second input mechanism. A second data structure engine 805 is shown to build a second data structure in traversal order from the first data structure, the second data structure in traversal order that includes a path from the first input mechanism to the second input mechanism. In some example embodiments, a traversal engine 806 is shown to conduct a data structure traversal through the use of use of the second data structure in traversal order to generate the visual indication of the input order.

In some example embodiments, the computer system 800 may include an location engine 807 to identify location input that includes a location of the input from the user with respect to a first input mechanism, the location associated with a portion of the document. This computer system 800 may also include a node retriever 808 to retrieve next node settings that includes a number of traversals along a data structure in traversal order, the first input mechanism included in the data structure in traversal order. Further, the computer system 800 may include a mapping engine 809 to map the location input to a target node in a path, the target node in the path included in the data structure in traversal order, and identified by the input from the user with respect to the first input mechanism. A traversal engine 810 is also shown to traverse the data structure in traversal order based upon the next node settings to start at the target node. A display 811 is shown to display the visual indication of the input order from the target node to a next node in the data structure in traversal order. In some example embodiments, the display 811 may also be used to display the document having a plurality of input mechanisms. Further, an input detection engine 812 may be used to detect a user action with respect to the plurality of input mechanisms. User actions may be hovering on a field contained in a document. Additionally, the display 811 may be used to display the visual indication of the input order relating to the plurality of input mechanisms.

Some example embodiments may include, the computer system 800 includes various blocks to be used to facilitate the operation of a screen reader. In some example embodiments, these blocks may be used to facilitate the reading of text fields without the use of a screen reader. A retriever 813 is shown that retrieves a document that includes a plurality of text fields. A reading order determination engine 814 is illustrated that determines a reading order that relates to the plurality of text fields. A dynamic display engine 815 is shown to, in conjunction with a display of the document, dynamically display a visual indication of the reading order that relates to the plurality of text fields. These text fields may be static text fields.

Figure 9:
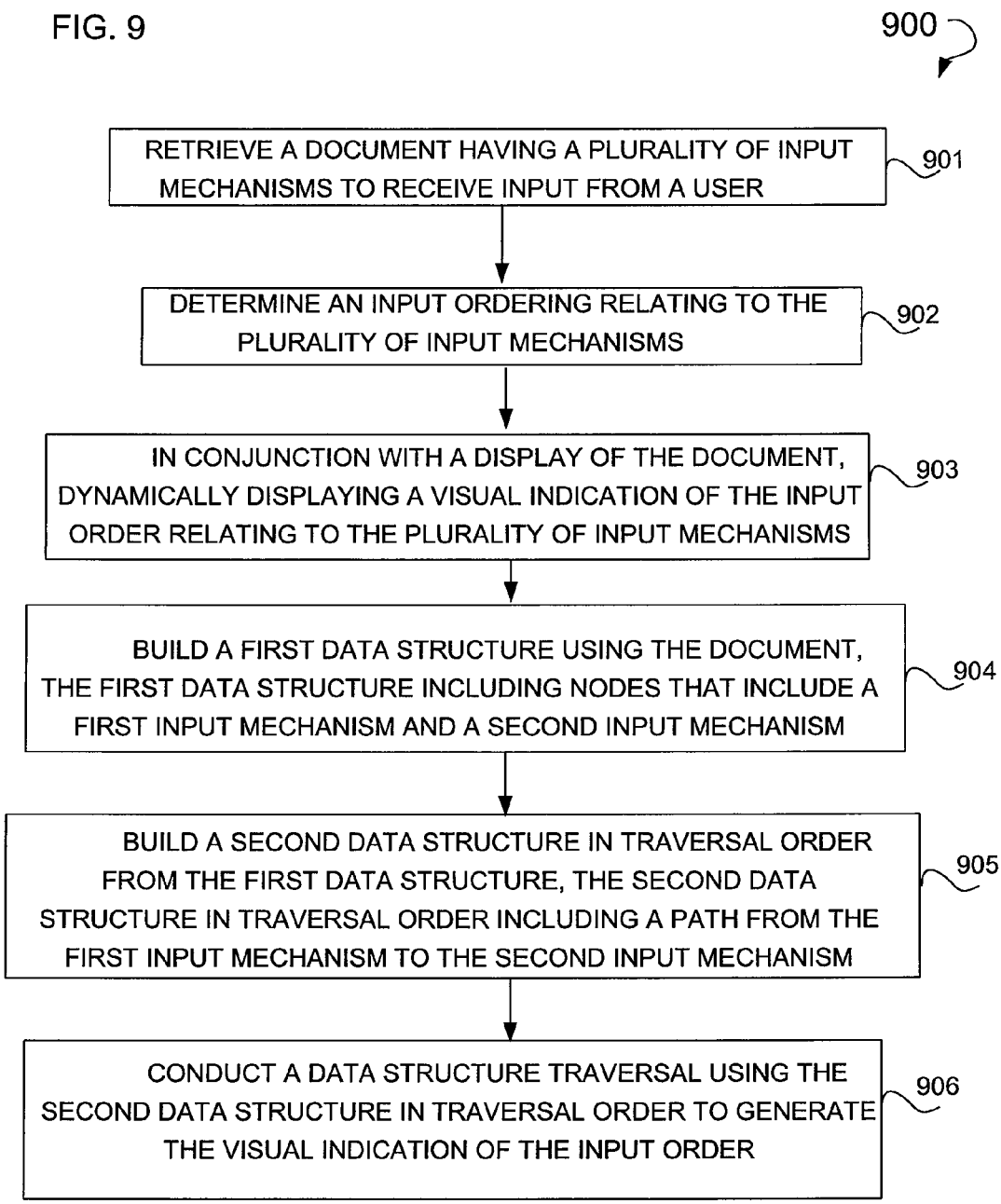
FIG. 9 is a flow chart illustrating a method, according to an example embodiment, used to generate a document with a traversal order shown.

FIG. 9 is a flow chart illustrating an example method 900 used to generate a document with a traversal order shown. Shown are various operations 901-908. These various operations may be executed upon the one or more devices 102, document server 110, and/or one or more devices 202. Illustrated is an operation 901 that, when executed, retrieves a document having a plurality of input mechanisms to receive input from a user. An operation 902 is also shown that, when executed, determines an input ordering relating to the plurality of input mechanisms. An operation 903 is shown that, when executed, in conjunction with a display of the document, dynamically displaying a visual indication of the input order relating to the plurality of input mechanisms. In some example embodiments, the plurality of input mechanisms include at least one of an input field, a radio button or a check box. Additionally, in some example embodiments, the determining of the input ordering is performed using a structural information of the document. In some example embodiments, the determining of the input ordering is performed using input ordering information associated with the document. Additionally, the display of the visual indication includes displaying visual indicia indicating a sequence in which the user is to provide input using the plurality of mechanisms. Moreover, the display of the visual indicia includes generating and displaying direction indicators between the plurality of input mechanisms of the document as displayed. The direction indicators may be arrows. In some example embodiments, operation 904 may be executed to build a first data structure using the document, the first data structure including nodes that include a first input mechanism and a second input mechanism. An operation 905 may be executed to build a second data structure in traversal order from the first data structure, the second data structure in traversal order including a path from the first input mechanism to the second input mechanism. Further, an operation 906 may be executed to conduct a data structure traversal using the second data structure in traversal order to generate the visual indication of the input order.

FIG. 10 is a flow chart illustrating a method 1000 continuing the operations shown in FIG. 9 used to generate a document with a traversal order shown. An operation 1001 may be executed to identifying location input including a location of the input from the user with respect to a first input mechanism, the location associated with a portion of the document. An operation 1002 may be executed to retrieve next node settings including a number of traversals along a data structure in traversal order, the first input mechanism included in the data structure in traversal order. An operation 1003 may be executed to map the location input to a target node in a path, the target node in the path included in the data structure in traversal order, and identified by the input from the user with respect to the first input mechanism. An operation 1004 may be executed to traverse the data structure in traversal order according to the next node settings starting at the target node. Operation 1005 may be executed to display the visual indication of the input order from the target node to a next node in the data structure in traversal order. In some example embodiments, various other operations may be performed as part of the method 1000. These operations may include displaying the document having a plurality of input mechanisms. Further, detecting a user action with respect to the plurality of input mechanisms. A user action may be a hover. Additionally, displaying the visual indication of the input order relating to the plurality of input mechanisms.

FIG. 11 is a flow chart illustrating an example method 1100 used to generate a document with a traversal order shown for text fields. Illustrated are various operations may be used to shown a reading order. This reading order may be used to assist in the operation of a screen reader. In some example embodiments, these operations may be used to facilitate the reading of static text fields without the use of a screen reader. Shown are various operations 1101-1103. These various operations may be executed upon the one or more devices 102, document server 110, and/or one or more devices 202. Illustrated is an operation 1101 that, when executed, retrieves a document including a plurality of text fields. An operation 1102 is shown that, when executed, determines a reading order relating to the plurality of text fields. Also, an operation 1103 is shown that, when executed, in conjunction with a display of the document, dynamically displays a visual indication of the reading order relating to the plurality of text fields. These text fields may be static text fields.

Figure 12:
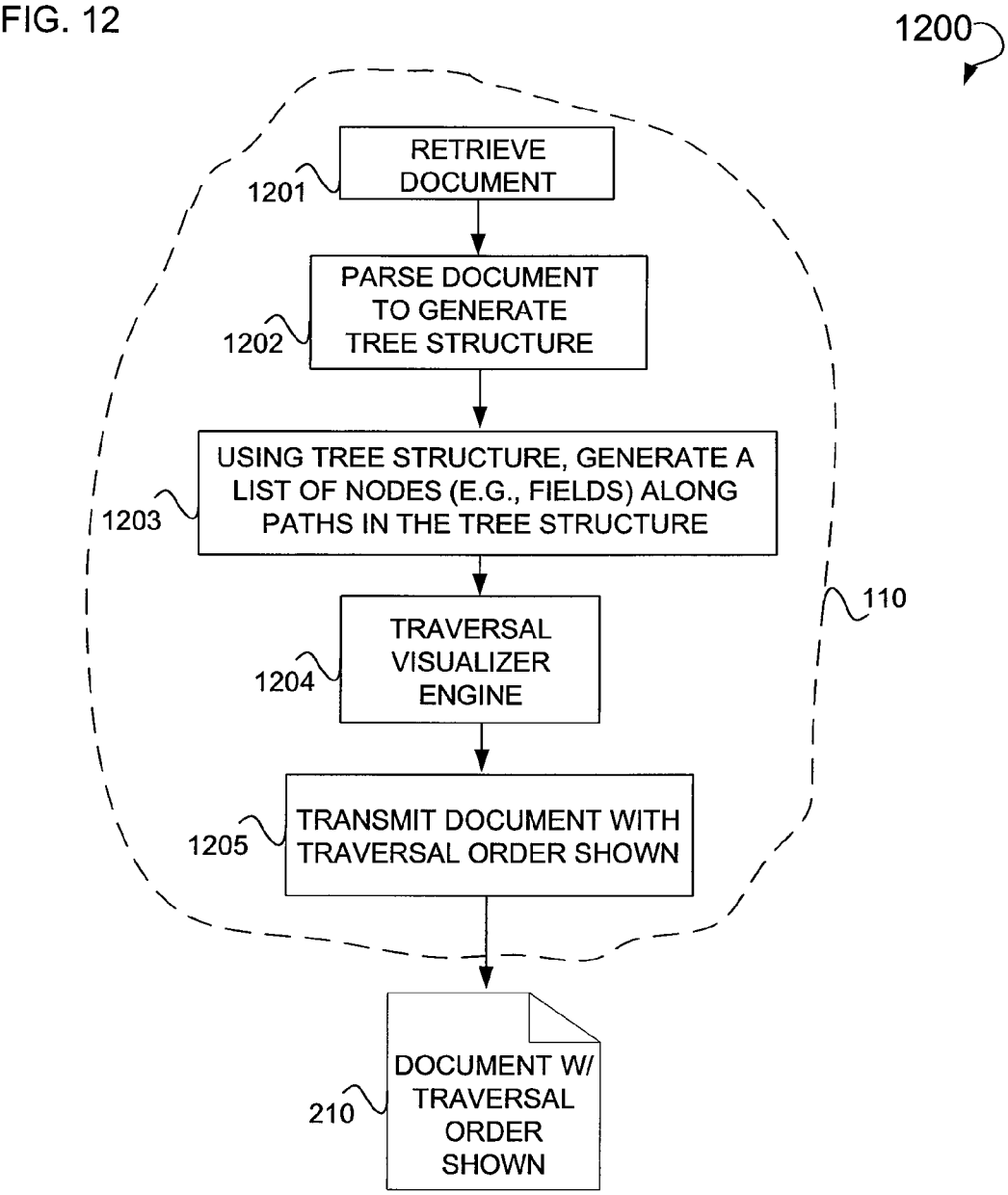
FIG. 12 is a flowchart illustrating a method, according to an example embodiment, used to generate a document with a traversal order shown.

FIG. 12 is a flowchart illustrating an example method 1200 used to generate a document with a traversal order shown. Illustrated are various operations 1201 through 1205 that may reside as part of, for example, the document server 110, or device 202. Illustrated is an operation 1201 that, when executed, retrieves the document 209 from the document database 111. An operation 1202 may be executed that parses the document, and XML representation contained therein, to generate some type of tree structure. This tree structure may be reflective of, for example, a DOM and may include the forms, sub forms, and fields as nodes within the tree structure. These forms, sub forms and fields may be contained within an HTML or XML based document. An operation 1203 may be executed that uses the tree structure to generate a list of nodes (e.g., fields, sub form or forms) along paths contained within the tree structure. This list of nodes may be in a traversal order as, for example, dictated by an XML representation. In some example embodiments, fields, sub forms or forms may be used alone or in combination to form a path. Further, this list of fields may be represented as a list of nodes in traversal order, as illustrated below. In some example embodiments, operations 1202 and 1203 may be a part of an XFA traversal service. Also shown is an operation 1204 that acts as a traversal visualizer engine. This operation 1204 when executed generates one or more of the previously illustrated example arrows 304, 305, 402, 403, 404, 502, 503, 504, 505, 603, 605, 703, 705, 707 and 709. An operation 1205 may be executed that transmits the document with traversal order shown 210.

In some example embodiments, an XML representation of various fields, and traversals between fields, is utilized to generate the arrows collectively illustrating a traversal order within a document. This XML representation may be created by, for example, a document designer 101 using a design IDE 107. Further, this XML representation may be included as part of the traversal order for a document 108. Additionally, this XML representation may be retrieved through the execution of operation 1201. The following XML representation illustrates not only nodes as sub forms, but also fields as child nodes. These fields may have traversal nodes as children. This XML representation is illustrated as follows:

```
<subform name="form1" layout="tb" restoreState="auto" locale="en_CA">
    <pageSet><!--name of sub form-->
    <pageArea name="Page1" id="Page1">
        <contentArea x="0.25 in" y="0.25 in" w="8 in" h="10.5 in"/>
        <medium stock="letter" short="8.5 in" long="11 in"/>
    </pageArea>
    </pageSet>
    <subform w="8 in" h="10.5 in">
    <subform name="Subform1" x="15.875 mm" y="6.35 mm" w="100 mm" h="50 mm">
        <field name="TextField1" y="6.35 mm" x="9.525 mm" w="62 mm" h="9 mm">
            <ui>
                <textEdit>
                    <border>
                        <edge stroke="lowered"/>
                    </border>
                </textEdit>
            </ui>
            <margin topInset="1 mm" bottomInset="1 mm" leftInset="1 mm" rightInset="1 nun"/>
            <caption reserve="25 mm">
                <value>
                    <text>Text Field</text>
                </value>
            </caption>
            <traversal>
                <traverse ref="Subform1.TextField2"/><!--traversal child instructing to traverse from Text Field 1 to Text Field 2-->
            </traversal>
        </field>
        <field name="TextField2" y="19.05 mm" x="9.525 mm" w="62 mm" h="9 mm">
            <ui>
                <textEdit>
                    <border>
                        <edge stroke="lowered"/>
                    </border>
                    <margin/>
                </textEdit>
            </ui>
            <margin topInset="1 mm" bottomInset="1 mm" leftInset="1 mm" rightInset="1 mm"/>
            <caption reserve="25 mm">
                <value>
                    <text>Text Field</text>
                </value>
            </caption>
        </field>
    </subform>
    <traversal>
        <traverse operation="first" ref="Subform1.TextField1"/>
    </traversal>
    </subform>
</subform>
```

This XML representation may be parsed by the operation 1202 to determine a traversal order. Here, for example, the XML representation shows a traversal order represented as: Text Field 1→Text Field 2. These text fields are child nodes of a sub form called form1.

Figure 13:
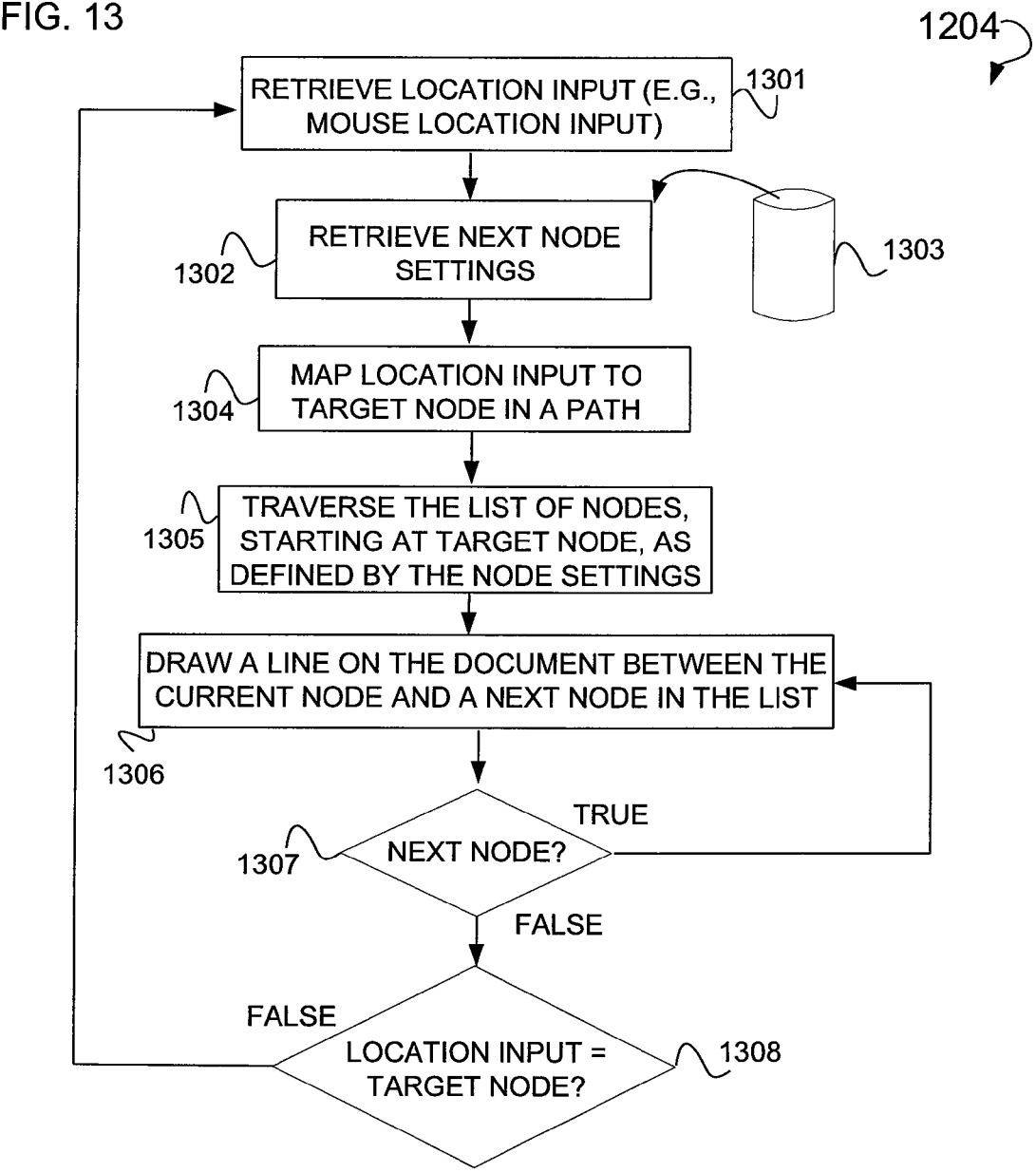
FIG. 13 is a flowchart illustrating the execution of an operation, according to an example embodiment, that acts as a traversal visualizer engine.

FIG. 13 is a flowchart illustrating the execution of example operation 1204. Shown is an operation 1301 that retrieves location input. This location input may be the location of a cursor such as, for example, cursors 301, 401, 501, 601 or 701 in relation to a form, sub form or field. This form, sub form or field may be a target node. An operation 1302 may be executed that retrieves a next node setting from, for example, at document database 1303. This next node setting may denote the number of traversal iterations, represented visually as arrows, between forms, sub forms or fields. This next node setting may be automatically or manually determined by a document designer 101, or the user 201. An operation 1304 may be executed that may map the location input to a target node in a path existing within a tree structure. This mapping may be based upon the target node containing some type of unique identifier value as, for example, visually represented by an indicator number. An operation 1305 may be executed that may traverse the list of nodes generated by operation 1203. This traversal may start at the target node.

In some example embodiments, once the target node is identified and the next node setting retrieved, a path will be iteratively walked or traversed. This path may be represented as a list of nodes in traversal order. Each link between the nodes in the path may be visually rendered as an arrow denoting a traversal between a form, sub form or field. Collectively these traversals may be considered as a traversal order. This traversal order may be backwards in terms of traversing the path from the target node to a previous node in the list of nodes in traversal order. Some example embodiments may include traversing forward in the list of nodes in traversal order from the target node to nodes after the target node. Some combination of backward and forward traversals may also be implemented. An operation 1306 may be executed that may present a line on a document as rendered from a current node to the next node in the path. This line may have an arrowhead rotated to the angle of the line. A decisional operation 1307 may be executed that determines whether a next node exists in the path. This next node determination may be based in part upon the next node setting. In cases where decisional operation 1307 is evaluated as "true," the previously shown operation 1306 may be re-executed. In cases where decisional operation 1307 is evaluated as "false," a further decisional operation 1308 may be executed. This decisional operation 1308 may determine whether or not the location input is still mapped to the target node. In cases where decisional operation 1308 is evaluated as "false," the operation 1301 is re-executed. The determination of the next node by decisional operation 1307 may be based upon whether or not any nodes remain in the path that the target node is a part of during the course of the traversal of the path. In some example cases, the next node determination by decisional operation 1307 may be based upon whether or not there are remaining nodes to be traversed as defined by the next node setting.

In some example embodiments, the operation 1306 may use a pixel locations of a portion of a field, sub form or form as the basis to the present the line on the document as rendered. For example, when executed, the operation 1306 may determine the pixel location of a first portion of a first field, sub form or form corresponding to a first field, sub form or field existing as part of the list of nodes. This operation 1306, when executed, may also determine the pixel location of a first portion of a second field, sub form or form corresponding to a second field, sub form or field existing as part of the list of nodes. Where a traversal exists between the first field, sub form or field, and the second field, sub form or form, a line may be presented from the first portion of the first field, sub form or form, to the first portion of the second form, sub form or form.

FIG. 14 is an example document 1400 illustrating a number of fields within the document as may be rendered within a design IDE or document viewer. Shown is a document 1400 (e.g., a purchase order document) containing a number of fields. Illustrated is a field 1401 titled "item," a field 1402 titled "description," a field 1403 titled "unit," a field 1405 titled "unit_price," and a field 1406 titled "total_price." Also illustrated is cursor 1404 hovered on the field 1403, where this field 1403 serves as a target node within a tree structure (see below). These various fields may be considered as a part of a sub form titled "detail."

Figure 15:
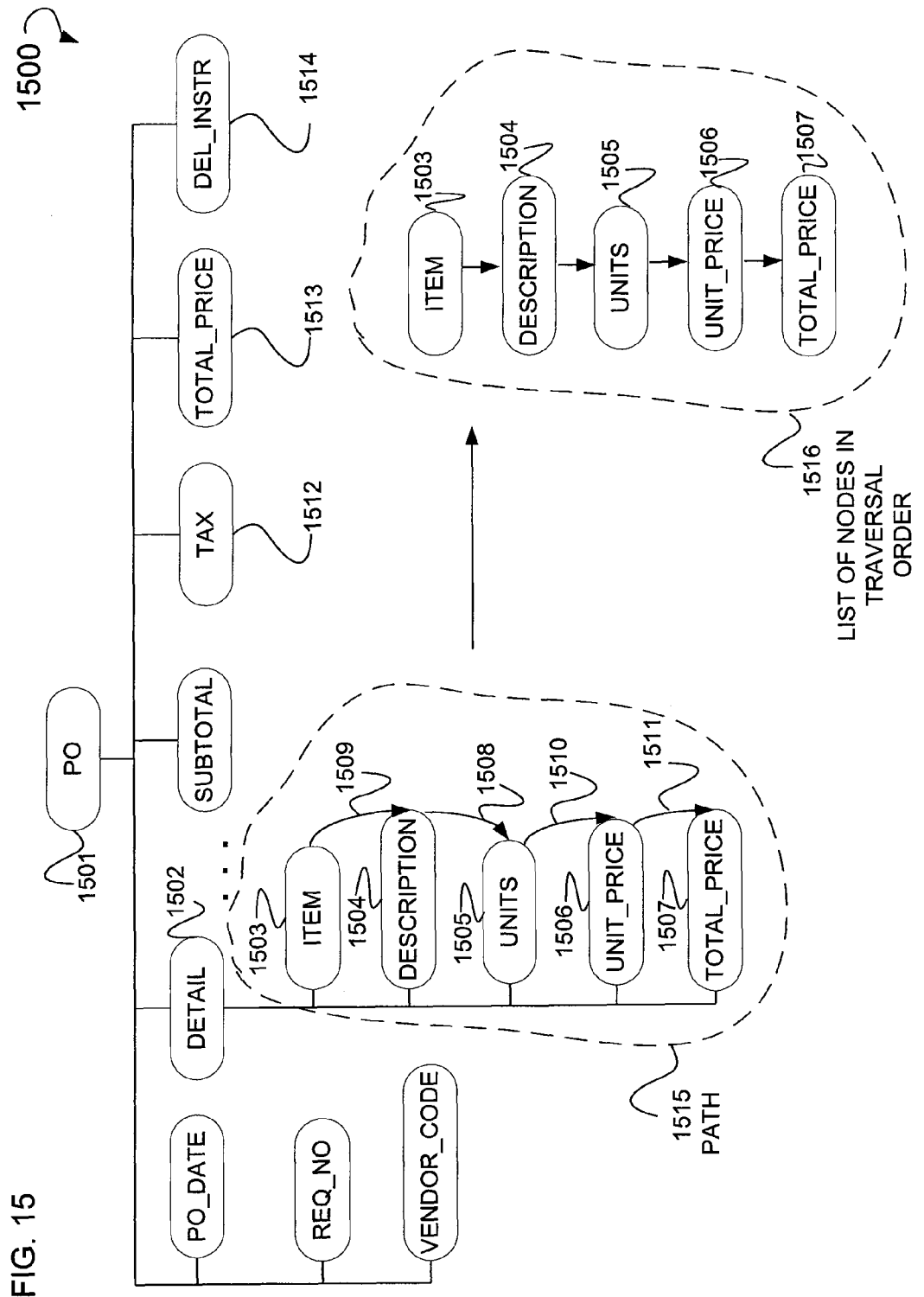
FIG. 15 is a tree structure, according to an example embodiment, reflecting a DOM.

FIG. 15 is an example tree structure 1500. This tree structure 1500 may be generated through the execution of operations 1202 and 1203. Shown is a tree structure 1500 containing a number of nodes. For example, a form node 1501 is shown that contains a number of child nodes. These child nodes include, for example, a sub form node 1502 titled "detail." This sub form node 1502 contains a number of child nodes in the form of fields. For example, a node 1503 titled "items" is a child of the sub form node 1502. Further nodes 1504, 1505, 1506 and 1507 are also child nodes of the sub form node 1502. The node 1503 may correspond to the field 1401, the node 1504 may correspond to the field 1402, the node 1505 may correspond to the field 1403, the node 1506 may correspond to the field 1405 and the node 1507 may correspond to the field 1406. Also shown is a node 1512 titled "tax," a node 1513 titled "total_price," and a node 1514 titled "del_instr." This tree 1500 may be represented elsewhere as a first data structure.

In some example embodiments, also shown as a part of this tree structure 1500 is a path 1515. A plurality of traversals are shown as a part of this path 1515 that collectively represent a traversal order. For example, a traversal 1509 connects the node 1503 and node 1504. Further, a traversal 1508 connects the node 1504 and node 1505. A traversal 1510 connects the node 1505 and 1506. A traversal 1511 connects the node 1506 and 1507. Using this path 1515, a list of nodes in traversal order 1516 may be generated showing a list of nodes (e.g., nodes 1503 through 1507) in their traversal order. This list of nodes in traversal order 1516 may be referenced elsewhere as a second data structure, or a data structure in traversal order.

Figure 16:
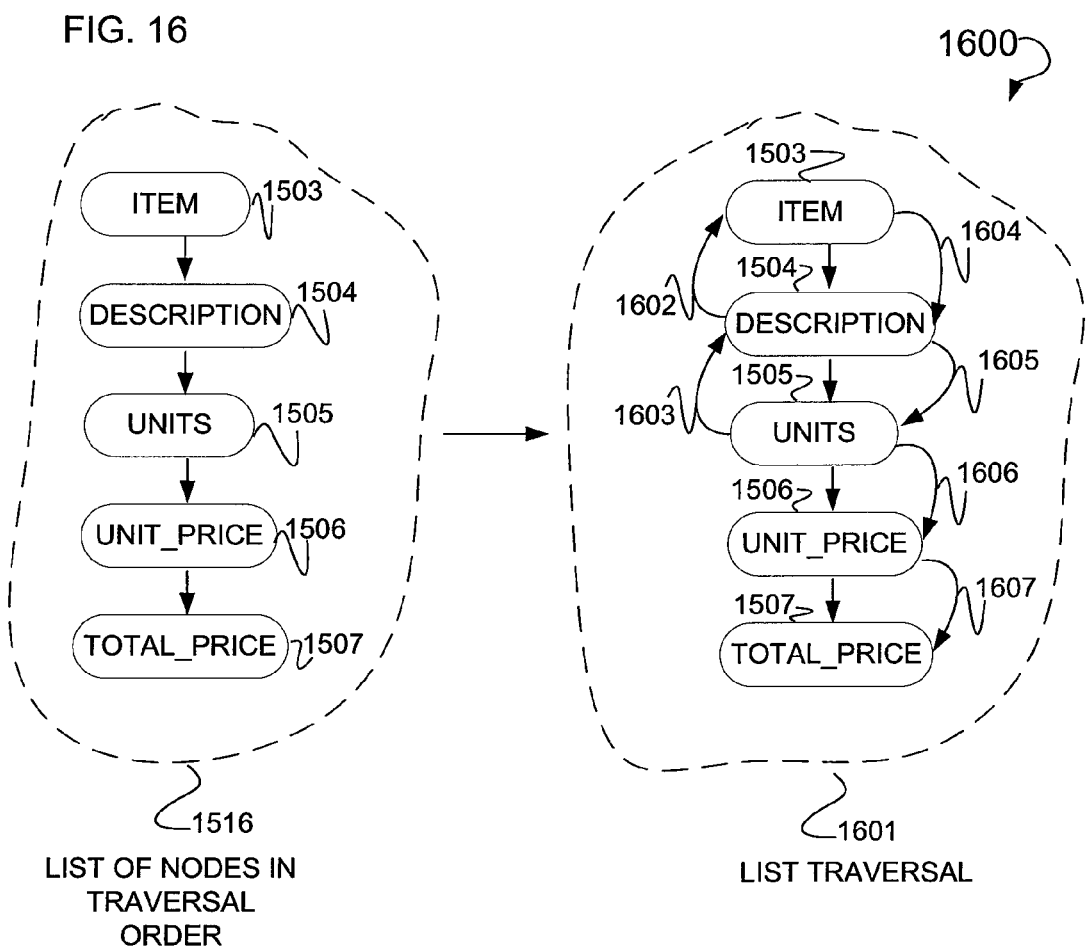
FIG. 16 is a diagram of a list conversion, according to an example embodiment, illustrating a conversion from a list of nodes in traversal order to a list traversal.

FIG. 16 is a diagram 1600 illustrating a conversion from a list of nodes in traversal order 1516 to a list traversal 1601. Shown is the list of nodes in traversal order 1516 and the conversion of the list of nodes in traversal order 1516 to a list traversal 1601. This list traversal 1601 may be generated by the operation 1204. Contained as a part of list traversal 1601 is a traversal 1603 from a node 1505 to the node 1504. A further traversal 1602 is shown from the node 1504 to the node 1503. An additional traversal 1604 is shown from the node 1503 to the node 1504. A traversal 1605 is used to show a traversal from the node 1504 to the node 1505. A traversal 1606 shows a traversal from the node 1505 to the node 1506. A traversal 1607 shows a traversal from a node 1506 to the node 1507.

In some example embodiments, the various traversals shown in FIG. 16 (e.g., traversals 1604 through 1607) reflect field traversals between fields in a document. The traversals 1602 and 1603 reflect the initial path traversal from a target node as hovered on by, for example, a cursor 1404 to the beginning of a list of nodes in traversal order 1516. The number of initial path traversals may be dictated by the next node setting. For example, the node setting may dictate that the two previous nodes in the traversal order be rendered as arrows in the document. The traversals 1604 through 1507 may represent field traversals in a document as illustrated by visually represented arrows. Further, this cursor 1404 may be construed to be identifying a location input.

FIG. 17 is an illustration of an example document 1700 with a traversal order shown for fields within the document 1700. Shown is a document 1700 with traversal order shown for fields within the document. Connecting some of the fields contained within this document 1700 are a number of arrows denoting a traversal order. For example, an arrow 1701 denotes a traversal order from the field 1401 to the field 1402. An arrow 1702 denotes a traversal order from the field 1402 to the field 1403. An arrow 1703 denotes traversal order from a field 1403 to a field 1405. An arrow 1704 denotes a traversal order from a field 1405 to a field 1406. Also shown is a cursor 1404 denoting a field 1403, otherwise referenced as a target node. In some example embodiments, the arrow 1701 corresponds to the traversal 1504. The arrow 1702 corresponds to the traversal 1505. The arrow 1703 corresponds to the traversal 1406. The arrow 1704 corresponds to the traversal 1607.

Example Database

Some embodiments may include the various databases (e.g., document database 111 and document database 1303) being relational databases, or, in some cases, OLAP-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, containing multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, or optimization algorithm known in the art.

Figure 18:
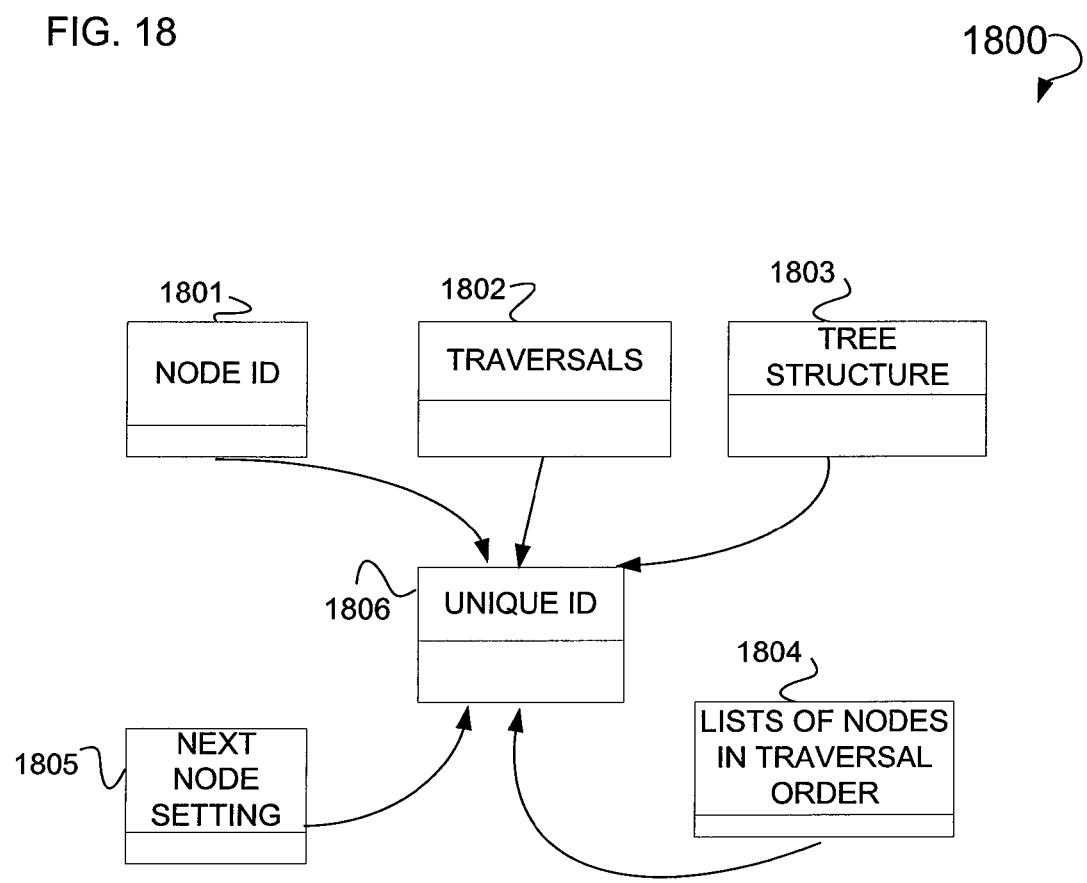
FIG. 18 is a Relational Data Schema (RDS), according to an example embodiment.

FIG. 18 is an example RDS 1800. Shown is a RDS 1800 containing a number of data tables (e.g., tables). A table 1801 is shown that contains node ID data. This node ID data (e.g., indicator data) may be used to uniquely identify a node in a tree structure representation of a document. An integer, float, double, or other numeric data type may be used to store a node ID. A table 1802 is shown that contains traversals between nodes in a tree structure, list or other suitable data type. These traversals may be stored as XML data types, strings, integers or other suitable data types. A table 1803 is shown that contains tree structures representing documents. These tree structures may be stored as XML data types, or some other suitable data type. A table 1804 is shown that stores lists of nodes in traversal order. This list may be stored as an XML data type, or some other suitable data type. A table 1805 is shown that stores subsequent node settings. These subsequent node settings may be stored as an integer or other numeric data type. A table 1806 is used to store unique identifier values for each entry into the tables 1801 through 1805.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is located remotely from a second computer system containing an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components contained therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example, implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

Figure 19:
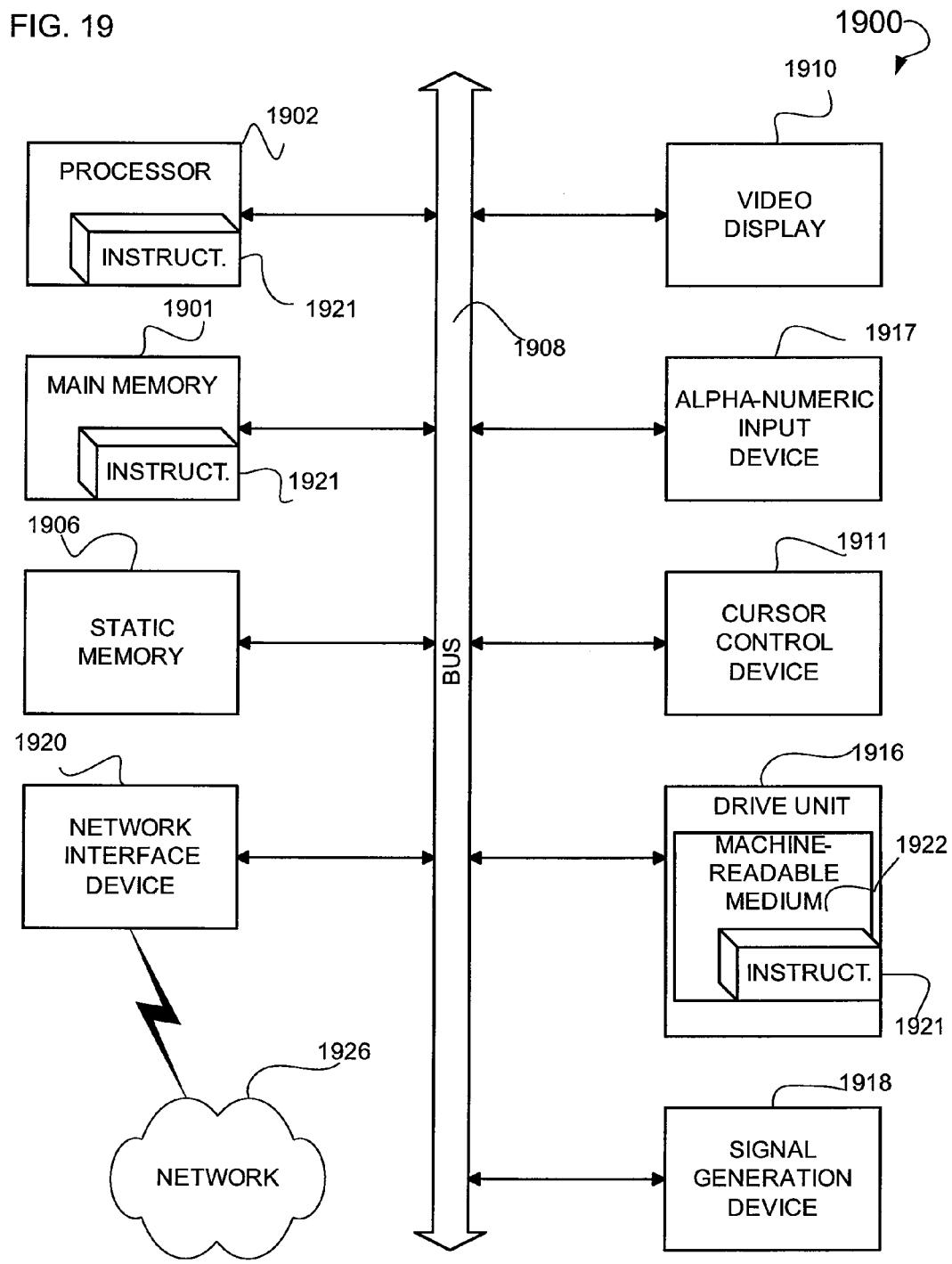
FIG. 19 shows a diagrammatic representation of a machine in the example form of a computer system, according to an example embodiment.

FIG. 19 shows a diagrammatic representation of a machine in the example form of a computer system 1900 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1900 includes a processor 1902 (e.g., a CPU, a Graphics Processing Unit (GPU) or both), a main memory 1901, and a static memory 1906, which communicate with each other via a bus 1908. The computer system 1900 may further include a video display unit 1910 (e.g., a Liquid Crystal Display (LCD) or a Cathode Ray Tube (CRT)). The computer system 1900 also includes an alphanumeric input device 1917 (e.g., a keyboard), a UI cursor controller 1911 (e.g., a mouse), a drive unit 1916, a signal generation device 1918 (e.g., a speaker) and a network interface device (e.g., a transmitter) 1920.

The disk drive unit 1916 includes a machine-readable medium 1922 on which is stored one or more sets of instructions and data structures (e.g., software) 1921 embodying or used by any one or more of the methodologies or functions illustrated herein. The software instructions 1921 may also reside, completely or at least partially, within the main memory 1901 and/or within the processor 1902 during execution thereof by the computer system 1900, the main memory 1901 and the processor 1902 also constituting machine-readable media.

The instructions 1921 may further be transmitted or received over a network 1926 via the network interface device 1920 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some example embodiments, a system and method is shown that visually represents the traversal order between fields, sub forms and forms within a document. This document may be written in HTML, XML, or some other suitable markup language. This visual representation of the traversal order may assist a document designer, user, or other suitable person in understanding the traversal order for filling in data fields within a document. This document may be an online form or other document having data fields that may be filled.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   retrieving a document including a plurality of input mechanisms to receive input from a user;
   determining an input ordering relating to the plurality of input mechanisms; and
   in conjunction with a display of the document, dynamically displaying a visual indication of the input order relating to the plurality of input mechanisms, the visual indication including direction indicators between the plurality of input mechanisms indicating a sequence in which the user is to provide input using the plurality of input mechanisms, the dynamic displaying of the visual indication of input order including displaying the input order of only the nodes surrounding an input mechanism during a mouse hover event over the input mechanism.

2. The computer implemented method of claim 1, further comprising:
   displaying the document having a plurality of input mechanisms;
   detecting a user action with respect to the plurality of input mechanisms; and
   displaying the visual indication of the input order relating to the plurality of input mechanisms.

3. The computer implemented method of claim 1, wherein the plurality of input mechanisms include at least one of an input field, a radio button or a check box.

4. The computer implemented method of claim 1, wherein the determining of the input ordering is performed using a structural information of the document.

5. The computer implemented method of claim 1, wherein the determining of the input ordering is performed using input ordering information associated with the document.

6. The computer implemented method of claim 1, wherein the direction indicators are arrows.

7. The computer implemented method of claim 1, further comprising:
   building a first data structure using the document, the first data structure including nodes that include a first input mechanism and a second input mechanism;
   building a second data structure in traversal order from the first data structure, the second data structure in traversal order including a path from the first input mechanism to the second input mechanism; and
   conducting a data structure traversal using the second data structure in traversal order to generate the visual indication of the input order.

8. The computer implemented method of claim 1, further comprising:
   identifying location input including a location of the input from the user with respect to a first input mechanism, the location associated with a portion of the document;
   retrieving next node settings including a number of traversals along a data structure in traversal order, the first input mechanism included in the data structure in traversal order;
   mapping the location input to a target node in a path, the target node in the path included in the data structure in traversal order, and identified by the input from the user with respect to the first input mechanism;
   traversing the data structure in traversal order according to the next node settings starting at the target node; and
   displaying the visual indication of the input order from the target node to a next node in the data structure in traversal order.

9. A computer implemented method comprising:
   retrieving a document including a plurality of text fields;
   determining a reading order relating to the plurality of text fields; and
   in conjunction with a display of the document, dynamically displaying a visual indication of the reading order relating to the plurality of text fields, the visual indication including direction indicators between the plurality of text fields indicating a sequence in which the user is to read using the plurality of text fields, the dynamic displaying of the visual indication of the reading order including displaying the reading order of only the nodes surrounding a text field during a mouse hover event over the text field.

10. A computer system comprising:
    a computer processor;
    a memory device;
    a document retriever stored as instructions in the memory device and executable by the computer processor to retrieve a document that includes a plurality of input mechanisms to receive input from a user;
    an input ordering engine stored as instructions in the memory device and executable by the computer processor to determine an input ordering that includes the plurality of input mechanisms; and
    a dynamic display engine stored as instructions in the memory device and executable by the computer processor to, in conjunction with a display of the document, dynamically display a visual indication of the input order that relates to the plurality of input mechanisms, the visual indication including direction indicators between the plurality of input mechanisms indicating a sequence in which the user is to provide input using the plurality of input mechanisms, the dynamic displaying of the visual indication of input order including displaying the input order of only the nodes surrounding an input mechanism during a mouse hover event over the input mechanism.

11. The computer system of claim 10, further comprising:
a display to display the document having a plurality of input mechanisms;
a input detection engine to detect a user action with respect to the plurality of input mechanisms; and
the display to display the visual indication of the input order relating to the plurality of input mechanisms.

12. The computer system of claim 10, wherein the plurality of input mechanisms include at least one of an input field, a radio button or a check box.

13. The computer system of claim 10, wherein the input ordering engine uses input ordering as performed through the use of structural information derived from the document.

14. The computer system of claim 10, wherein the input ordering engine uses input ordering information associated with the document.

15. The computer system of claim 10, wherein the direction indicators are arrows.

16. The computer system of claim 10, further comprising:
a first data structure engine to build a first data structure through the use of the document, the first data structure that includes nodes that include a first input mechanism and a second input mechanism;
a second data structure engine to build a second data structure in traversal order from the first data structure, the second data structure in traversal order that includes a path from the first input mechanism to the second input mechanism; and
a traversal engine to conduct a data structure traversal through the use of use of the second data structure in traversal order to generate the visual indication of the input order.

17. The computer system of claim 10, further comprising:
a location engine to identify location input that includes a location of the input from the user with respect to a first input mechanism, the location associated with a portion of the document;
a node retriever to retrieve next node settings that includes a number of traversals along a data structure in traversal order, the first input mechanism included in the data structure in traversal order;
a mapping engine to map the location input to a target node in a path, the target node in the path included in the data structure in traversal order, and identified by the input from the user with respect to the first input mechanism;
a traversal engine to traverse the data structure in traversal order based upon the next node settings to start at the target node; and
a display to display the visual indication of the input order from the target node to a next node in the data structure in traversal order.

18. A computer system comprising:
a computer processor;
a memory device;
a retriever stored as instructions in the memory device and executable by the computer processor to retrieve a document that includes a plurality of text fields;
a reading order determination engine stored as instructions in the memory device and executable by the computer processor to determine a reading order that relates to the plurality of text fields; and
a dynamic display engine stored as instructions in the memory device and executable by the computer processor to, in conjunction with a display of the document, dynamically display a visual indication of the reading order that relates to the plurality of text fields, the visual indication including direction indicators between the plurality of text fields indicating a sequence in which the user is to read using the plurality of text fields, the dynamic displaying of the visual indication of reading order including displaying the reading order of only the nodes surrounding a text field during a mouse hover event over the text field.

19. A non-transitory machine-readable medium comprising instructions stored thereon, which when implemented by one or more machines, cause the one or more machines to perform the following operations:
retrieve a document having a plurality of input mechanisms to receive input from a user;
determine an input ordering relating to the plurality of input mechanisms; and
in conjunction with a display of the document, dynamically display a visual indication of the input order relating to the plurality of input mechanism, the visual indication including direction indicators between the plurality of input mechanisms indicating a sequence in which the user is to provide input using the plurality of input mechanisms, the dynamic displaying of the visual indication of input order including displaying the input order of only the nodes surrounding an input mechanism during a mouse hover event over the input mechanism.

\* \* \* \* \*